United States Patent [19]

McCauley

[11] Patent Number: 4,847,678

[45] Date of Patent: Jul. 11, 1989

[54] DUAL MODE GEN-LOCK SYSTEM WHICH AUTOMATICALLY LOCKS TO COLOR BURST OR TO SYNC INFORMATION

[75] Inventor: David K. McCauley, Henrietta, N.Y.

[73] Assignee: Eastman Kodak Company, Rochester, N.Y.

[21] Appl. No.: 142,628

[22] Filed: Jan. 11, 1988

[51] Int. Cl.$^4$ .............................................. H04N 9/44
[52] U.S. Cl. ....................................... 358/19; 358/149; 358/326
[58] Field of Search ................... 358/19, 17, 326, 181, 358/20, 185, 149

[56] References Cited

U.S. PATENT DOCUMENTS

| | | | |
|---|---|---|---|
| 3,733,432 | 5/1973 | Arimura et al. | |
| 3,969,758 | 7/1976 | Okey | 358/8 |
| 4,038,683 | 7/1977 | Thorpe et al. | 358/19 |
| 4,122,788 | 10/1978 | Mikado | 358/19 |
| 4,145,705 | 3/1979 | Yoshinaka | 358/8 |
| 4,214,262 | 7/1980 | Mizukami | 358/19 |
| 4,422,103 | 12/1983 | Kanamaru | 358/19 X |
| 4,468,687 | 8/1984 | Munezawa et al. | 358/19 |
| 4,555,679 | 11/1985 | Katsuyama | 331/17 |
| 4,612,568 | 9/1986 | den Hollander et al. | 358/19 |
| 4,613,827 | 9/1986 | Takamori et al. | 331/20 |
| 4,639,765 | 1/1987 | D'Hont | 358/19 |
| 4,675,724 | 6/1987 | Wagner | 358/19 |
| 4,736,238 | 4/1988 | Moriyama | 358/19 |

Primary Examiner—James J. Groody
Assistant Examiner—Victor R. Kostak
Attorney, Agent, or Firm—Robert H. Sproule

[57] ABSTRACT

A dual mode gen-lock system generates high frequency clocking pulses which are automatically synchronized to an external video signal. During the presence of color burst information in the external video signal, the clocking pulses are synchronized to the color burst. However in the absence of the color burst, the clocking pulses are synchronized to the horizontal sync pulses of the external video signal. This is accomplished by providing a phase locked loop which has an oscillator which free runs at the desired clock frequency, and which has a phase detector for comparing the phase difference between a selected portion of the PLL reference signal and a selected portion of either the color burst or horizontal sync pulses.

17 Claims, 11 Drawing Sheets

FIG. 5A
V_REF LEADS SYNC

FIG. 5B
V_REF LAGS SYNC

DUAL MODE GEN-LOCK SYSTEM WHICH AUTOMATICALLY LOCKS TO COLOR BURST OR TO SYNC INFORMATION

TECHNICAL FIELD

The present invention relates to apparatus and methods for generating a clock output for synchronizing a video system to an external video signal.

BACKGROUND OF THE INVENTION

It is sometimes desirable to have the capability of synchronizing together two or more video systems. For example, in a television news broadcasting studio, it may be desirable to switch between a "live" presentation of the news commentators on one camera, a videotape on a second camera, and a slide presentation on a third camera. In order to accomplish this switching without diminishing pictures quality, it is necessary to synchronize the operation of all three cameras.

More particularly, if independent video systems do not operate in continuous synchronization, switching between one video system and the other for broadcast transmission can cause the video picture to be adversely affected, such as by rolling in the vertical and tearing in the horizontal. This can occur until the systems have become synchronized together.

Conventionally, master sync generator have been incorporated into video cameras. A conventional method of syncing two or more cameras is to have a lead camera set to an internal mode for generating a composite video signal, with the sync generators in the remaining cameras locked to this video signal.

In an exemplary embodiment of the present invention, there is provided a video system which utilizes an image sensor such as a charge coupled device (CCD) to generate video images. It is an object of the present invention to synchronize the imager to an external video signal. However, the CCD sensor utilizes a clocking signal which has a much higher frequency than is present in a conventional video signal. Therefore, in order to minimize the differential between the imager clocking frequency and the external video frequency, the highest frequency portion, i.e., color burst, of the external video signal is utilized whenever possible as a reference to generate the signal for clocking the imager. However, in the absence of a color burst signal in the external video such as during the transmission of black and white video, or during the vertical blanking interval, it is desirable that the next highest frequency available in the composite video signal, i.e. horizontal sync information, be utilized as a reference for generating the CCD clocking signal.

A number of conventional synchronization systems have been disclosed. For example, in U.S. Pat. No. 4,555,679 by Katsuyama there is provided a system which changes the freqency band characteristics of a phase lock loop depending upon whether the PLL is in a synchronous or an asynchronous state.

Okey, in U.S. Pat. No. 3,969,758 discusses a synchronizing circuit which utilizes two oscillators, one of which is phase locked to the color burst of a composite video signal, and the other of which is phase locked to the horizontal sync information of the composite video signal.

A playback apparatus for reproducing a composite color video signal is disclosed in U.S. Pat. No. 4,145,705 by Yoshinaka in which there is provided a phase lock loop circuit for regenerating a carrier reference signal in response to horizontal synchronizing signals of a composite color video signal.

In U.S. Pat. No. 4,122,488 by Mikado there is provided a gen-lock system which generates a stabilized synchronizing signal even when an external reference signal includes noise or is temporarily interrupted.

A digital video processing system disclosed in U.S. Pat. No. 4,612,568 by den Hollander et al., converts an analog video signal to a digital format utilizing sampling clock signals which are phase locked to the color burst information of a video signal.

Arimura et al., in U.S. Pat. No. 3,733,432 discloses a system for producing a continuous signal in synchronous phase with the color burst signal of a composite video input by means of an oscillator whose oscillation frequency is approximately equal to that of the burst signal.

In U.S. Pat. No. 4,675,724 by Wagner, there is disclosed an analog phase lock loop which operates at four times the subcarrier frequency of an input video signal and which feeds back a four-times subcarrier sampling clock to an adjustable analog-to-digital converter for time-based correction of the signal.

D'Hont in U.S. Pat. No. 4,639,765 provides a synchronization system which includes an internally generated video signal which is synchronized to an external video signal.

A system which has a first clock output generated by a phase lock loop synced to a horizontal sync signal, and a second clock output synchronized to a color burst signal, is disclosed by Takamori et al. in U.S. Pat. No. 4,613,827.

Furthermore, in U.S. Pat. No. 4,468,687 by Munezawa et al., there is provided a synchronizing system which separates synchronizing signals from a composite video signal and utilizes the separated synchronizing signals to remove color burst information from a video input.

And further more, in U.S. Pat. No. 4,038,683 by Thorpe et al., there is disclosed a system for synchronizing the video signal output of a television camera to an external referency utilizing first and second phase lock loops for maintaining synchronism of the line and color signal components of the video signal with the referency.

SUMMARY OF THE INVENTION

The present invention pertains to apparatus for clocking a video system in response to an external video signal. The apparatus includes input means for receiving the external video signal which includes a first signal containing color burst and sync information, and a second signal containing sync information and no color burst. Also included are means for detecting the presence of the color burst in the external video signal and for generating a first output signal in response thereto. In addition, there are means for detecting the absence of the color burst and the presence of the sync information in the external video signal, and for generating a second output signal in response thereto. And further there are means which are responsive to the first output signal for generating a first clock output which is synchronous with the color burst for clocking the video system. Also provided are means, which are responsive to the second output signal, for generating a second clock output which is synchronous with the sync information for clocking the video system.

It is therefore an object of the present invention to provide apparatus for clocking a video system in response to external video signal.

BRIEF DESCRIPTION OF THE DRAWINGS

These and other objects and advantages of the present invention will become more readily apparent upon reading the following detailed description in conjunction with the attached drawings, in which:

FIGS. 4A and 4B are timing diagrams wherein

FIGS. 5A and 5B are timing diagrams wherein

DETAILED DESCRIPTION OF THE INVENTION

As discussed somewhat in the Background of the Invention, the present invention pertains to a system for locking a high frequency imaging device to an external video signal, such as that which is generated from a separate video camera.

In a exaemplary embodiment of the present invention, the imaging device is a charge coupled device (CCD) sensor which has a clocking frequency of 42.96 MHz; this clocking frequency being an integer multiple (12) of the color burst frequency of the external video signal, and an integer multiple (2730) of the horizontal sync frequency. In the present invention, the color burst information contained in the external video signal is used as a referency to generate signals for clocking the imager.

Unfortunately, during the vertical blanking interval or during non-color transmissions, the color burst information is not present in the external video signal. In this event, the apparatus of the present invention generates clocking pulses which are automatically synchronized to the horizontal sync pulses in the external video signal. This is accomplished by means of a phase locked loop having an oscillator that free runs at the imager clocking frequency of approximately 42.96 MHz. A system is provided in the present invention to lock the oscillator of the phase locked loop (PLL) to the color burst information, and in the absence thereof, to the horizontal sync information of the external video signal. In the absence of both the color burst and horizontal sync information, the PLL oscillator free runs at the required imager clock frequency of 42.96 MHz.

Figure 1:
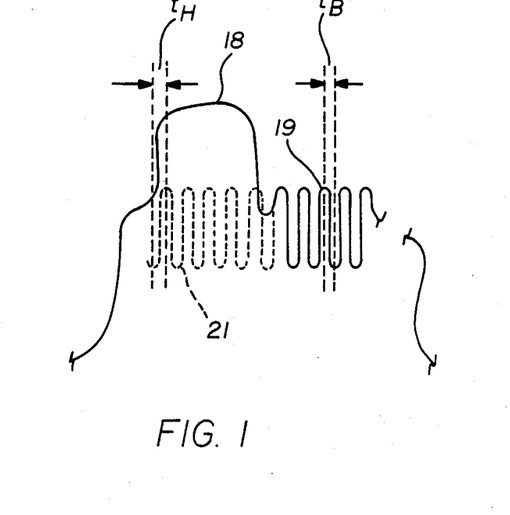
FIG. 1 is a portion of a composite video signal including horizontal sync and color burst information.

This is accomplished in the present invention by selecting either one edge of the color burst and one edge of the horizontal sync for comparison to a reference signal output of the PLL. Since it is desirable to utilize the higher frequency color burst, if present, to adjust the output of the PLL, the selected edge of the horizontal sync is ignored unless the color burst is not present. As shown in FIG. 1, windows $t_B$ and $t_H$ are generated for each scan line of the external video signal. That is, window $t_H$ is generated about the leading edge of the horizontal sync pulse designated by the number 18, while the window $t_B$ is generated about the leading edge of the fifth cycle of color burst designated by the number 19. These windowed edges are utilized to adjust the frequency of the PLL in a manner to be discussed later.

Figure 2:
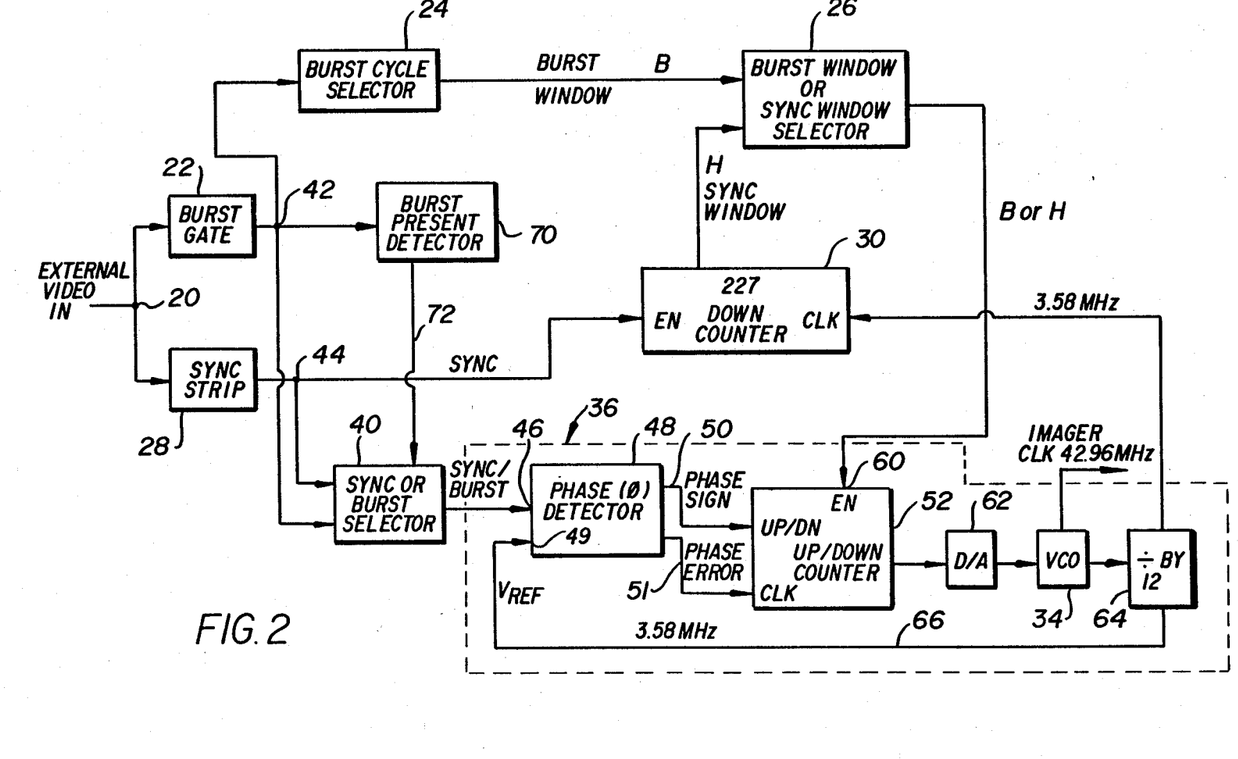
FIG. 2 is an overview of the present invention set forth in a simplified block diagram.

This will become clearer by referring to FIG. 2 which shows a synchronizing circuit of the present invention in simplified block form. Preceeding from the left, external composite video is fed in from a junction 20 to a burst gate 22 which passes only the color burst information, if present, to a burst cycle selector 24 which generates the window $t_B$ about the leading edge of the fifth cycle of color burst in the form of a burst window pulse B. This window pulse B is then fed to a burst window/sync window selector 26. At the same time, the external video signal from junction 20 is stripped of its horizontal sync information at a sync stripper 28, and the horizontal sync information is fed to a down counter 30. Upon receipt of the leading edge of the horizontal sync pulse, counter 30 begins counting down from the number 227 to generate the sync window pulse H. More specifically, it is known that there are 227.5 cycles of the color subcarrier between the leading edges of successive horizontal sync pulses. Thus by clocking down the counter 30 two hundred twenty seven times at the color subcarrier frequency, the window $t_H$ (FIG. 1) is created about each horizontal sync pulse in the form of the sync window pulse H.

Continuing with the brief overview by referring to FIG. 2, generation of the imager clock signal is accomplished by means of a voltage controlled oscillator 34 which has a free running frequency of 42.96 MHz, and which is part of a phase locked loop (PLL) circuit indicated at 36. The input to the PLL is from a sync/burst selector 40 which receives the color burst output from burst gate 22 via a junction 42, as well as the horizontal sync output from the sync stripper 28 via a junction 44. If both horizontal sync and burst information are present in the external video signal, selector 40 selects only the burst information for transmission to the input 46 of the PLL 36. Otherwise, if only horizontal sync information is present, this is passed on to the input of the PLL. It is this sync or burst information which is later windowed by the aforementioned pulses B or H in order to synchronize the clock output of the PLL.

Operation of the PLL 36 involves a phase detector 48 (FIG. 2) which compares a feed back reference signal $V_{REF}$ (approximately 3.58 MHz) from the oscillator 34 (present at an input 49) with the burst information, and in the absence thereof, with the horizontal sync information. In response to a phase difference between $V_{REF}$ and the color burst or horizontal sync, the phase detector 48 generates two output signals; these being (1) a PHASE SIGN output 50 which is fed to an up/down input 51 of a downstream counter 52, and a PHASE ERROR output 51 which is fed to the clock input of the counter 52. More specifically, upon initial power up of the system, a quantity midway between zero and the counter's maximum count is loaded into the counter 52. If the phase detector 48 determines that the burst information leads the PLL reference signal $V_{REF}$, for example, then the counter 52 is placed in the up counting mode by the PHASE SIGN output, and is clocked up by the PHASE ERROR output. This speeds up the oscillator. On the other hand, if the phase detector determines that horizontal sync information, for example, lags $V_{REF}$, then the counter is placed in a down counting mode by PHASE SIGN and it is clocked down by the PHASE ERROR output. This slows down the oscillator.

In the present invention, it should be appreciated that the phase detector 48 is continously generating PHASE SIGN and PHASE ERROR outputs during the presence of color burst and horizontal sync information. However, in order to accurately adjust the VCO output, only the windowed portion (leading edge) of the color burst or horizontal sync signal is utilized for comparison with $V_{REF}$. In the present invention the leading edge of the horizontal sync pulse and the leading edges of the color burst pulses coincide with zero crossings of the PLL oscillator output, $V_{REF}$, when they are synchronized. More specifically, by referring to FIG. 1, it is apparent that if the color burst 19 of the external video signal is interpolated back as shown by the dashed lines designated by the number 21, the leading edge of the color burst also corresponds to the leading edge of the horizontal sync pulse 18 within a tolerance of plus or minus forty degrees, which is within RS-170A specifications adopted by the U.S. Government for transmission of color video. Thus in the present invention, the VCO output is adjusted by comparing a zero crossing of the oscillator output, $V_{REF}$, with the leading edge of a selected cycle of color burst, and in the absence thereof, with the leading edge of the horizontal sync pulse. This is accomplished by means of the window pulses H or B, which enable the counter 52 (FIG. 2) only during the presence of the leading edge of the fifth cycle of color burst, or in the absence thereof, during the presence of the leading edge of the horizontal sync pulse.

Continuing downstream in FIG. 2, conversion of the digital output from counter 52 to an analog signal is accomplished by a D/A converter 62 whose output is fed to the input of VCO 34 causing it to speed up or slow down depending upon whether the counter 52 is counting up or down. The output from the VCO is divided down by a factor of twelve by a divide-by-12 circuit 64, and this divided-down output (3.58 MHz) is fed back as signal $V_{REF}$ via a loop 66 to the reference input 49 of the phase detector 48. In addition, the divided down output $V_{REF}$ is also fed to the 227 down counter 30 to clock it from its initial count of 227 down to zero for generating the sync window pulse H.

Completing this overview, the presence of color burst information in the external video signal is detected by a burst presence detector 70 (FIG. 2) whose input is tied to the junction 42, and which generates an output to the sync/burst selector 40 so that only the color burst information is fed to the phase detector 48 during the presence of color burst, and inthe absence of color burst, the horizontal sync information is fed to the phase detector.

Figure 3:
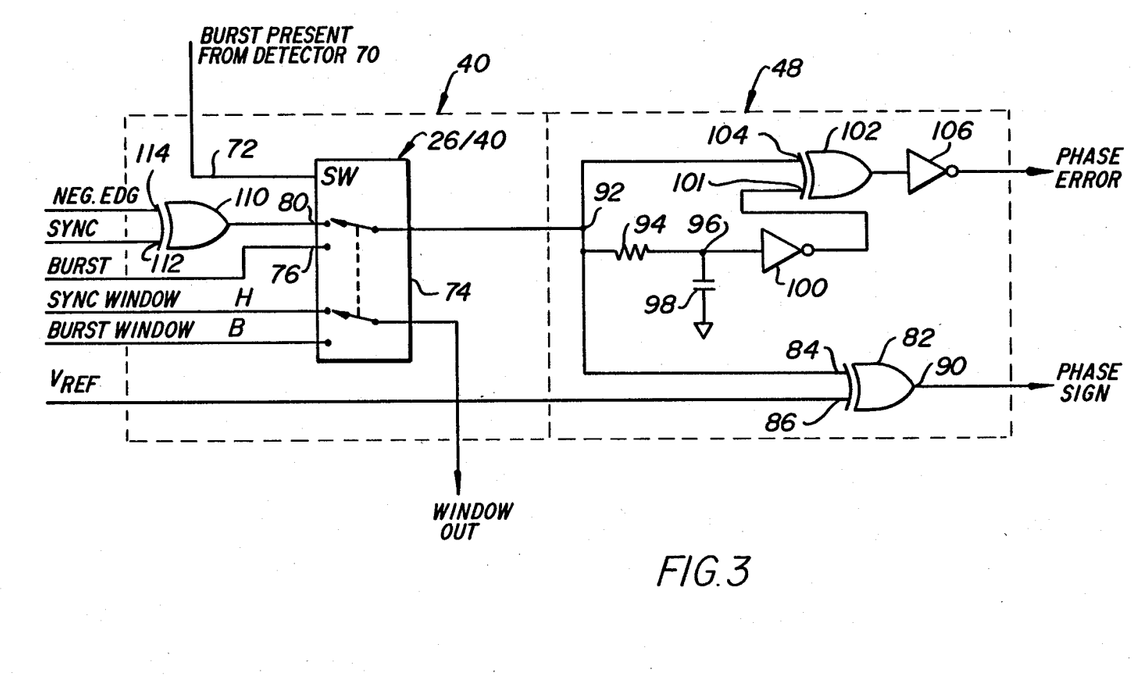
FIG. 3 is a more detailed diagram of the sync/burst selector, sync window/burst window selector, and phase detector blocks shown in FIG. 2.
Figure 4A:
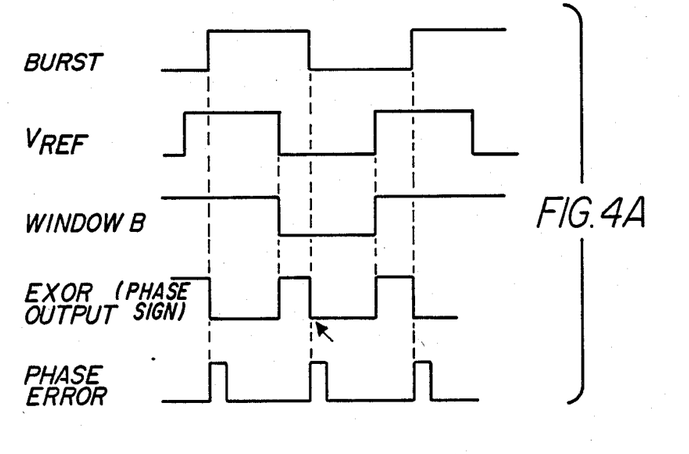
FIG. 4A is a timing diagram showing the generation of a PHASE SIGN pulse when a reference frequency, $V_{REF}$, leads the color burst signal, and FIG. 4B Shows the generation of the PHASE SIGN pulse when $V_{REF}$ lags the color burst signal.

Turning now to a more detailed discussion of the invention, reference is made to FIG. 3 where there is shown the PLL phase detector 48 which generates the PHASE ERROR and PHASE SIGN outputs. The detector 48 includes an exclusive OR gate 82 (at the lower right) which detects the phase sign between $V_{REF}$ and the incoming sync or color burst signal. In this enbodiment, EXOR gate 82 has an input 84 tied to the output of an upstream multiplexer 74, and the other input 86 receives the oscillator output $V_{REF}$. The multiplexer 74 acts as a switch to pass either color burst or sync information to the phase detector. In this manner, the output of EXOR gate 82 controls the up/down direction of counter 52 (FIG. 2). For example, if as shown in FIG. 4A, the oscillator output $V_{REF}$ leads the color burst, i.e. the leading edge of $V_{REF}$ leads the leading edge of the windowed burst, then the EXOR gate output (PHASE SIGN) is a logic low (as indicated by the arrow) during the presence of the windowed PHASE ERROR pulse, which causes the counter 52 to count down one increment, and in turn to generate a lower frequency output from VCO 34. Although the EXOR gate 82 is continually generating an output signal during the presence of color burst or sync, the counter 52 is enabled only by pulses B or H during the presence of the window.

Figure 4B:
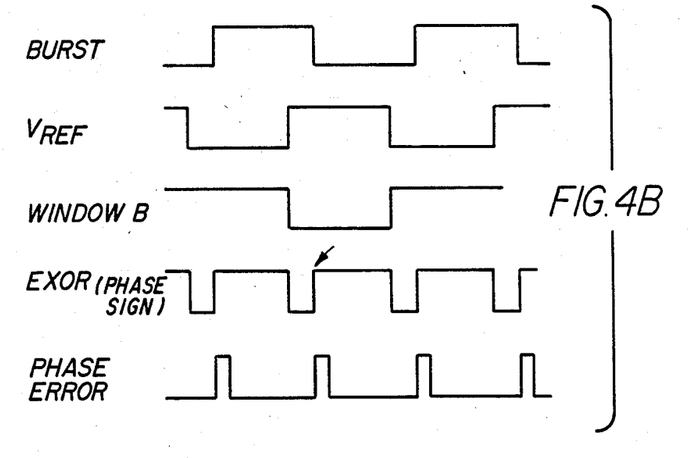

Now with regard to the opposite case shown in FIG. 4B, where $V_{REF}$ lags the color burst, then the windowed portion of the EXOR output is a logic high when the PHASE ERROR pulse occurs, thereby incrementing counter 52 upward by one count. This increases the frequency of the oscillator output.

Figure 5A:
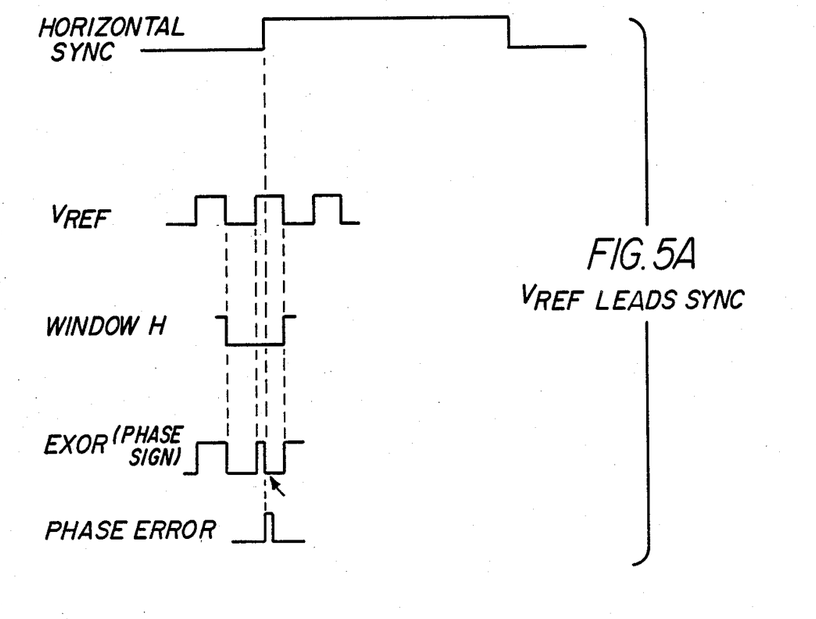
FIG. 5A shows the generation of the PHASE SIGN pulse when $V_{REF}$ leads the horizontal sync signal.
Figure 5B:
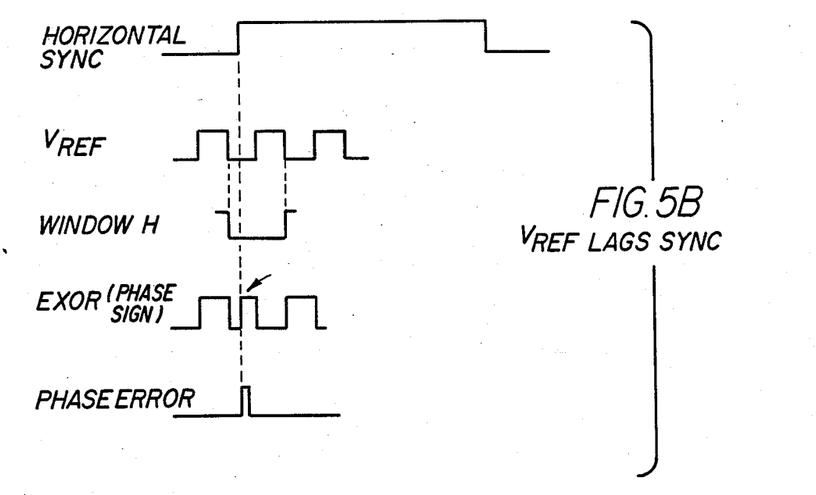
FIG. 5B shows the generation of the PHASE SIGN pulse when $V_{REF}$ lags the horizontal sync signal.

Turning now to the mode where ther is an absence of color burst information, but where horizontal sync information is present, reference is made to FIGS. 5A and 5B. As shown in FIG. 5A, $V_{REF}$ leads the horizontal sync pulse, therefore the windowed portion of the EXOR output is a logic low when the PHASE ERROR pulse occurs. This causes the counter 52 to increment downward by one count which in turn causes the oscillator frequency to decrease. On the other hand, as shown in FIG. 5B, $V_{REF}$ lags the horizontal sync pulse, therefore the windowed portion of the EXOR output is a logic high when the PHASE ERROR clock occurs, which causes the counter 52 to increment by one count, and thereby increase the frequency of $V_{REF}$.

It should be appreciated that by providing the windows $t_B$ and $t_H$ (FIG. 1) to select a burst edge or horizontal sync edge for comparison to the oscillator output $V_{REF}$, automatic switching between the color burst information and horizontal sync information is accomplished to provide a synchronized clock output.

In order to clock the counter 52 once per horizontal scan line, the previously mentioned PHASE ERROR signal (FIG. 3) is also generated at phase detector 48. More specifically, the burst or sync output from the multiplexer 74 is fed through a junction 92 and a resistor 94 whose downstream end is tied to a junction 96. One end of a capacitor 98 is tied to junction 96 and its other end is tied to ground. The resistor 94 and capacitor 98 form an RC network which delays the signal through a downstream inerter 100 which has its output tied to an input 101 of an EXOR gate 102. In addition, the other input 104 of EXOR gate 102 is tied directly to the junction 92. In this manner, the signal from junction 92 reaches input 104 before it reaches input 101. Thus, for example, when the signal out of the multiplexer 74 is a steady low for a period of time that exceeds the RC time constant, input 104 to EXOR gate 102 is low while input 101 is high, generating a high output from gate 102 which is inverted to a low by the downstream inverter 106. However, when a low to high transition occurs at junction 92 (due to a horizontal sync or color burst pulse), input 104 goes high almost immediately, whereas input 101 remains high until capacitor 98 charges up to the threshold of the inverter 100. During the time that input 104 and input 101 are high, the output from EXOR gate 102 goes low and this low output is fed to inverter 106 which generates the PHASE ERROR output. It should be appreciated that for every horizontal line of external video, the counter 52 is clocked once, either up or down, depending upom the PHASE SIGN output.

Figure 6:
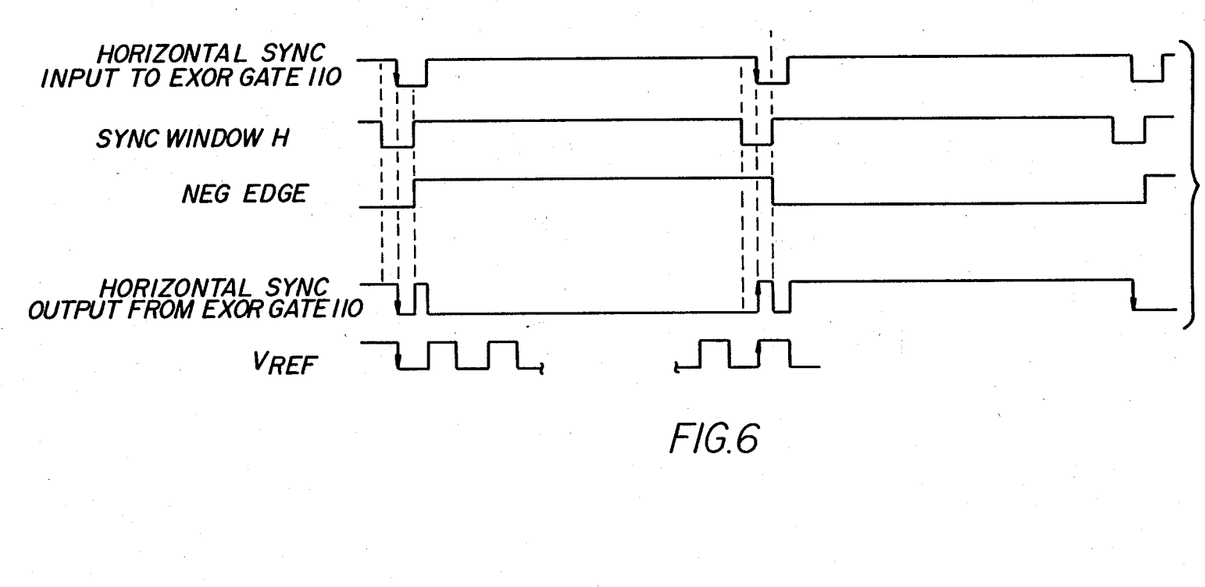
FIG. 6 is a timing diagram showing an output signal which compensates for the inversion of the horizontal sync signal relative to $V_{REF}$.

It is known that the relationship of the horizontal sync to the oscillator output $V_{REF}$ is governed by the ratio 455/2. That is, the frequency of $V_{REF}$ is an odd multiple of the horizontal sync frequency. Thus for every other horizontal line, the horizontal sync pulse is 180° out of phase with $V_{REF}$. If left uncorected, this can result in inaccurate clocking of counter 52 (FIG. 2). To overcome this problem, upstream of the multiplexer 74 there is provided an EXOR gate 110 for inverting the horizontal sync output every other horizontal line. EXOR gate 110 includes an input 112 for receiving the horizontal sync information, and another input 114 for receiving a negative edge (NEG EDGE) pulse which is generated in a manner to be described later, When NEG EDGE is EXORed with the horizontal sync information, a horizontal sync output (from EXOR gate 110) is generated which is inverted every other line as shown in FIG. 6. In this manner, while the horizontal sync input to EXOR gate 110 inverts every other line with respect to $V_{REF}$, the horizontal sync output from gate 110 does not. In this manner, the 180° phase shift between $V_{REF}$ and horizontal sync is compensated for.

Figure 7:
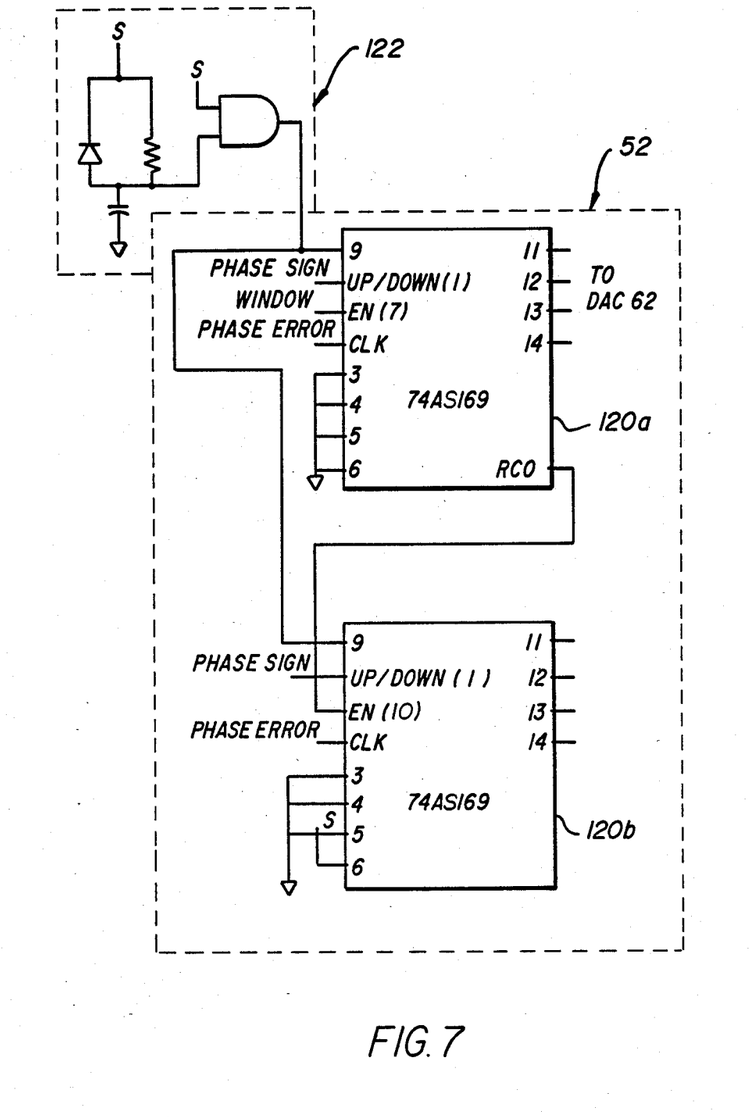
FIG. 7 is a more detailed diagram of the up/down counter shown in FIG. 2.

Continuing with the discussion of the PLL 36, the counter 52 is described in greater detail in FIG. 7. In an exemplary embodiment, the counter 52 includes a pair of cascaded counters 120a, 120b, such as two 74AS169 counters. The LOADCOUNT (Pins 9) of the counters 120 are tied to a conventional power up reset circuit indicated at 122 which loads a count having a value which is one half of the maximum count. Up or down counting is controlled by the PHASE SIGN input to pins 1, while the clocks are tied to the PLL phase detector PHASE ERROR output. The counter 120a, which generates the least significant nibble of the count, is enabled by the B or H window output from detector 26 to pin 7, while the counter 120b, which generates the most significant nibble, is enable by the ripple carry output (RCO) from counter 120a.

Figures 8, 9:
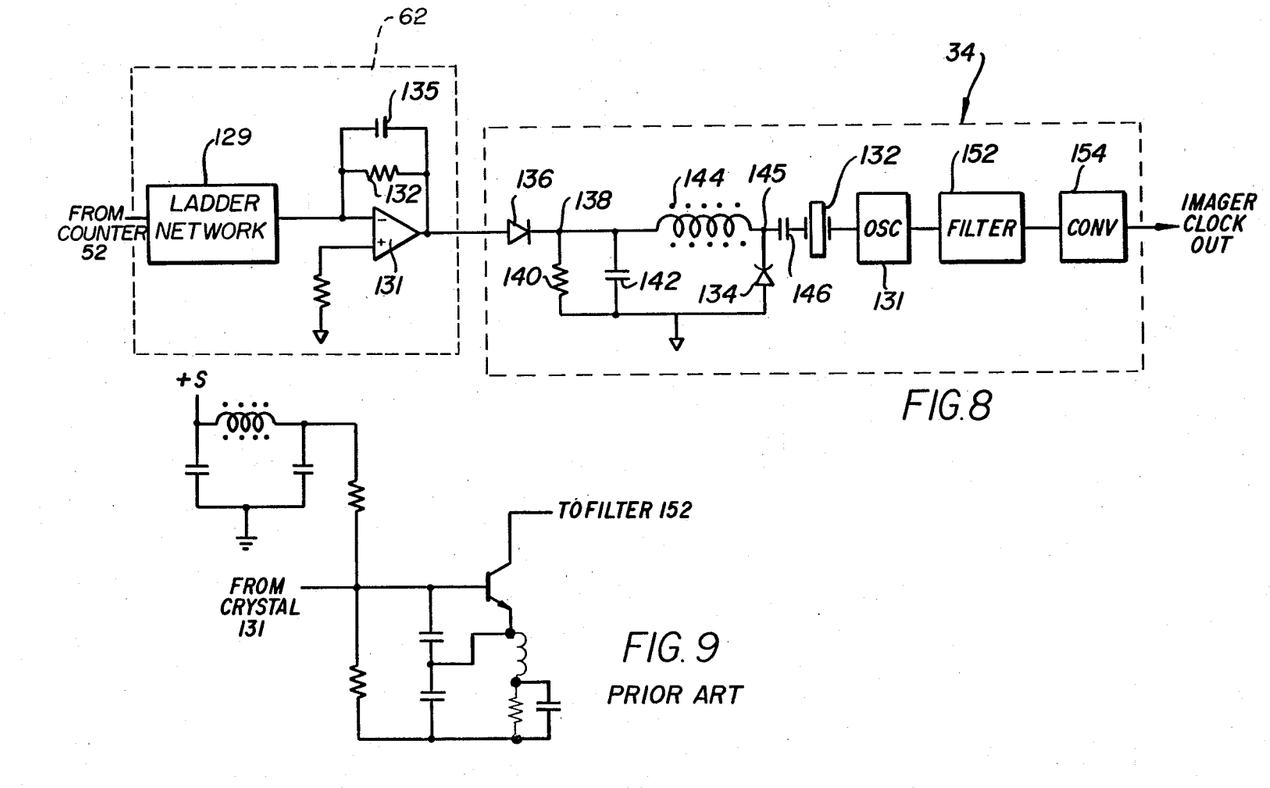
FIG. 8 is a more detailed diagram of the voltage control oscillator (VCO) shown in FIG. 2.
FIG. 9 is a diagram of a conventional oscillator circuit.

Downstream of the counter 52, the digital outputs are fed to the conventional digital to analog converter 62 (FIG. 2), with the resulting analog signals being fed to the voltage controlled oscillator 34 which is shown in greater detail in FIG. 8. The D/A converter 62 includes a Ladder Network 129 as well as a current-to-voltage amplifier formed by an op amp 131 and a resistor 133. A low pass filter formed by resistor 133 and a parallel capacitor 135 has a 3db point of about three kHz for reducing any jitter which may occur when switching between synchronization of the video system to the color burst and synchronization to the horizontal sync. This jitter results from the aforementioned phase shift (up to a maximum of forty degrees) between the color burst and horizontal sync. This filter also eliminates transient spikes which may occur during switching of DAC 62.

The VCO 34 includes a conventional oscillator circuit 137 which is shown in more detail in FIG. 9 but which is not described further herein. The oscillator circuit's resonant frequency is controlled by a crystal 132 (FIG. 8) and an upstream varactor diode 134. In the equivalent AC circuit, the oscillator formed by the crystal 132 and oscillator circuit 137 is in series with the variable capacitance of the diode 134. Broadly, the output from the current-to-voltage converter generates a DC voltage across the varactor diode 134 to change its capacitance. This changing capacitance in series with the crystal causes a change in the crystal's resonant freuency which in turn changes the resonant frequency of the oscillator circuit, and in this manner adjusts the frequency of the VCO output. In the present invention, the total permissible VCO deviation from nominal (42.96Mhz) is approximately plus or minus 7.87 Khz so as to limit the phase error to about plus or minus 0.5 cycles of $V_{REF}$ when the phase measurement is taken. This is accomplished by setting the gain of the DAC 62 and VCO 34 appropriately.

More specifically with regard to FIG. 8, the output of DAC 62 is fed through a diode 136 and resistor 140 for compensating temperature drift of the varactor diode; the resistor 140 being tied between a junction 138 and ground. Also tied between the junction 138 and ground is a capacitor 142 which forms a low pass filter with the resistor 140 for additional filtering. Also tied to junction 138 is the upstream end of a ferrite bead 144 whose downstream end is tied to the cathode of the varactor diode 134; the anode of diode 134 being tied to ground. The junction 145 of the ferrite bead 144 and the cathode of the varactor diode 134 are tied to the upstream end of a DC blocking capacitor 146, whose downstream end is tied to crystal 132. Looking at the circuit from the crystal 132 in a leftward direction, the ferrite bead 144 and the capacitor 142 form a low pass filter which prevents the sinusoidal signal generated across the varactor diode from reaching upstream portions of the circuit.

The oscillator circuit 137 is connected to a downstream conventional bandpass filter 152 which is centered around the 42.96 MHz oscillating frequency. Further downstream of the filter 152 is a sinusoid-to-TTL converter 154 for converting the analog signal to a digital output for clocking the image sensor.

Having described the operation of the phase locked loop for generating the imager clock signal, attention will now be turned to the remaining elements of the invention which are upstream of the PLL. Beginning with the input to junction 20 in FIG. 10, the external video signals are fed to a conventional sync stripper 28, which is an integrated circuit such as an LM 1881 manufactured by National Semiconductor, that internally strips the sync signal and outputs it from pin 1. Other outputs from the stripper 28 include (1) a vertical sync pulse from pin 3 which is a logic high when the vertical sync portion of the external video signal is present, (2) a back porch signal from pin 5 which is low when the back porch is present, (3) and a field output from pin 7 which is low during presence of the even field and high during presence of the odd field of the external video signal.

Gating of the color burst portion of the external video signal downstream of junction 20 is accomplished by means of the burst gate 22 (FIG. 10) which includes a transistor 162 which has its base tied through a current limiting resistor 163 to junction 20, and its emitter tied through a resistor 166 to the back porch output (pin 5) of the sync stripper 28. Transistor 162 is biased so that during the presence of the back porch when pin 5 is low, transistor 162 is turned on thereby producing an amplified color burst signal at its collector. Noise spikes are removed from the color burst signal by means of a bandpass filter which includes a capacitor 164 tied in parallel with an inductor 165 in a manner that their upper ends are tied to the positive power supply (iS) and their lower ends tied to the collector of transistor 162.

Conversion of the analog color burst signal to a digital TTL output is accomplished by a downstream transistor 166 which has its base tied through an AC coupling capacitor 168 to the collector of transistor 162, and which is biased by resistors 170, 172 to operate between saturation and cutoff in response to the gated color burst signal.

Continuing downstream, the presence of the grated color burst information is sensed by the burst presence detertor 70 (FIG. 10) which includes a buffer driver 174 for feeding the gated TTL output from the collector of transistor 166 to a peak detector. The peak detector is formed by a transistor 176 which has its base tied to the output of buffer 174, its collector connected to the posistive supply, and its emitter tied to the upper ends of (i) a resistor 178 and (ii) a parallel capacitor 180, whose lower ends are tied to ground. The discharge time constant of the RC network formed by resistor 178 and capacitor 180 is selected so that the capacitor 180 discharges through resistor 178 to a level below the low logic threshold of a downstream flip flop 182 within about three quarters of a horizontal line time (about forty five microseconds). This architecture permits the capacitor 180 to be rapidly charged and slowly discharged The charging time constant is determined by the RC network and the source current of transistor 176. This RC network is selected so that the capacitor charge exceeds the logic high threshold of flip flop 182 after about four cycles of color burst. The output from the capacitor 180 is fed to the D input of flip-flop 182 which is latched by the end of the back porch signal from pin 5 of the sync stripper 28; the back porch signal being fed into the clock input of the flip flop 182 via a signal line 184. As may be recalled, the resulting latched output represents the burst present signal (FIG. 2) which is input to the multiplexer 74 (FIG. 3) for switching the color burst information, and in the absence thereof, the horizontal sync pulse, to the downstream phase detector 48.

Figure 10:
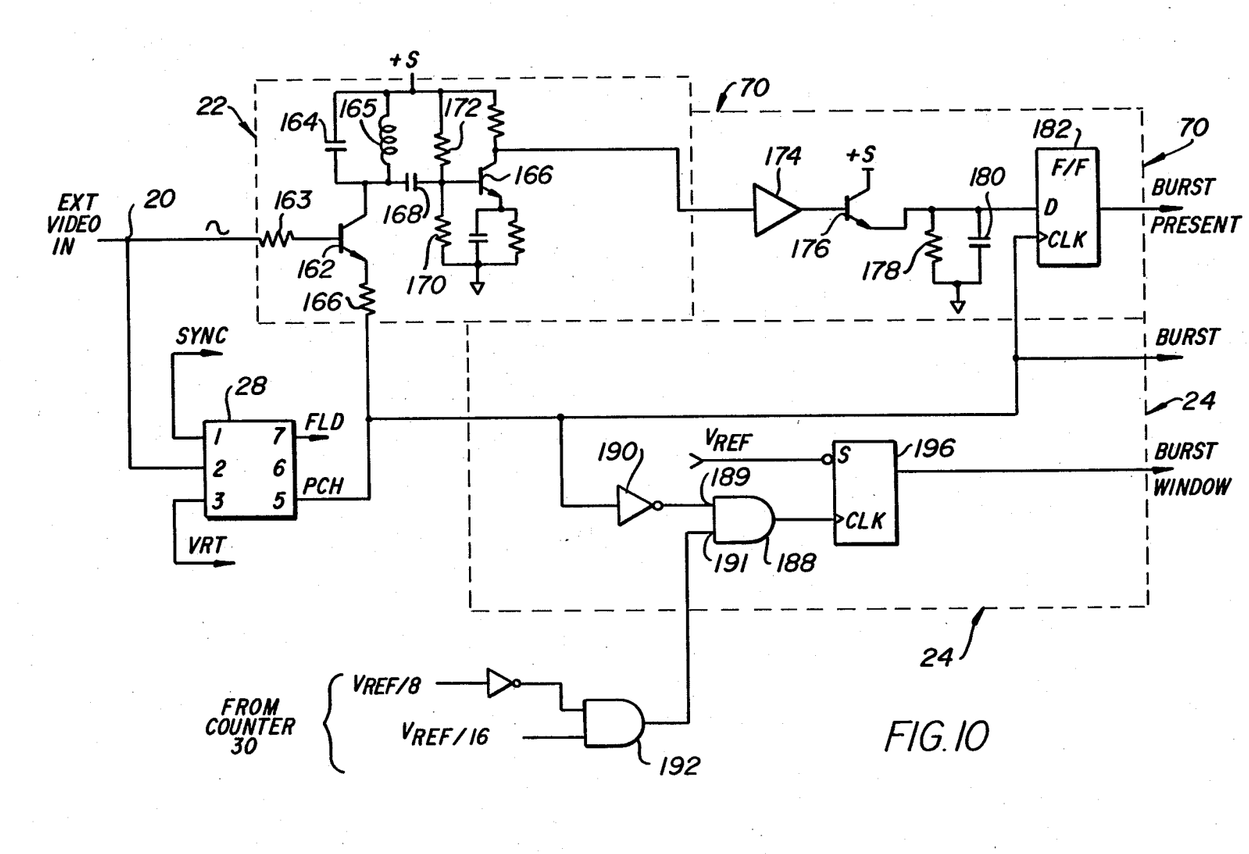
FIG. 10 is a more detailed diagram of the sync stripper burst gate, burst present detector, and burst cycle selector shown in FIG. 1.
Figure 11:
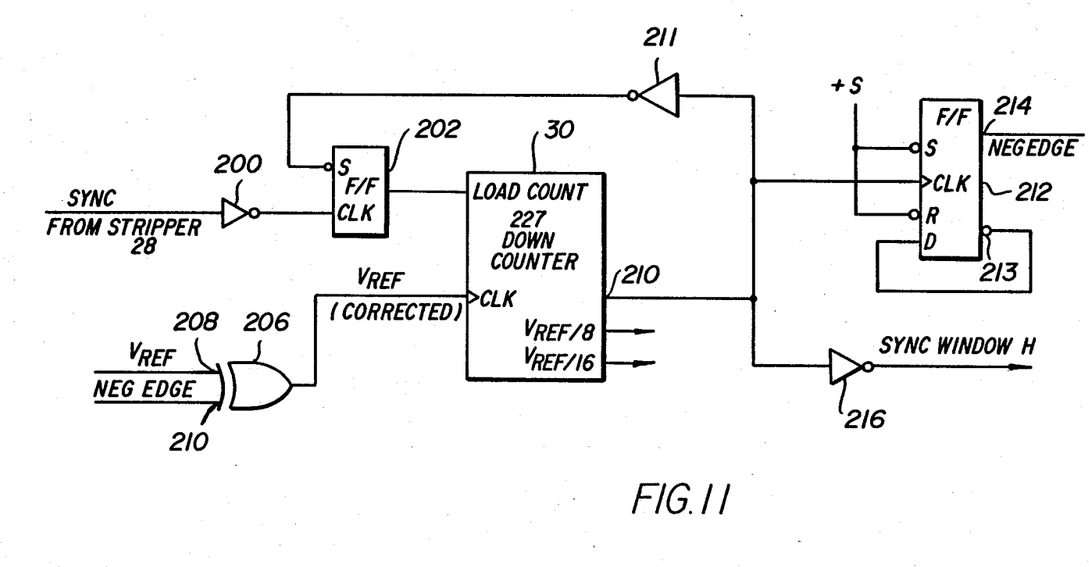
FIG. 11 is a detailed diagram of a 227 down counter and NEG EDGE pulse generator.
Figure 12:
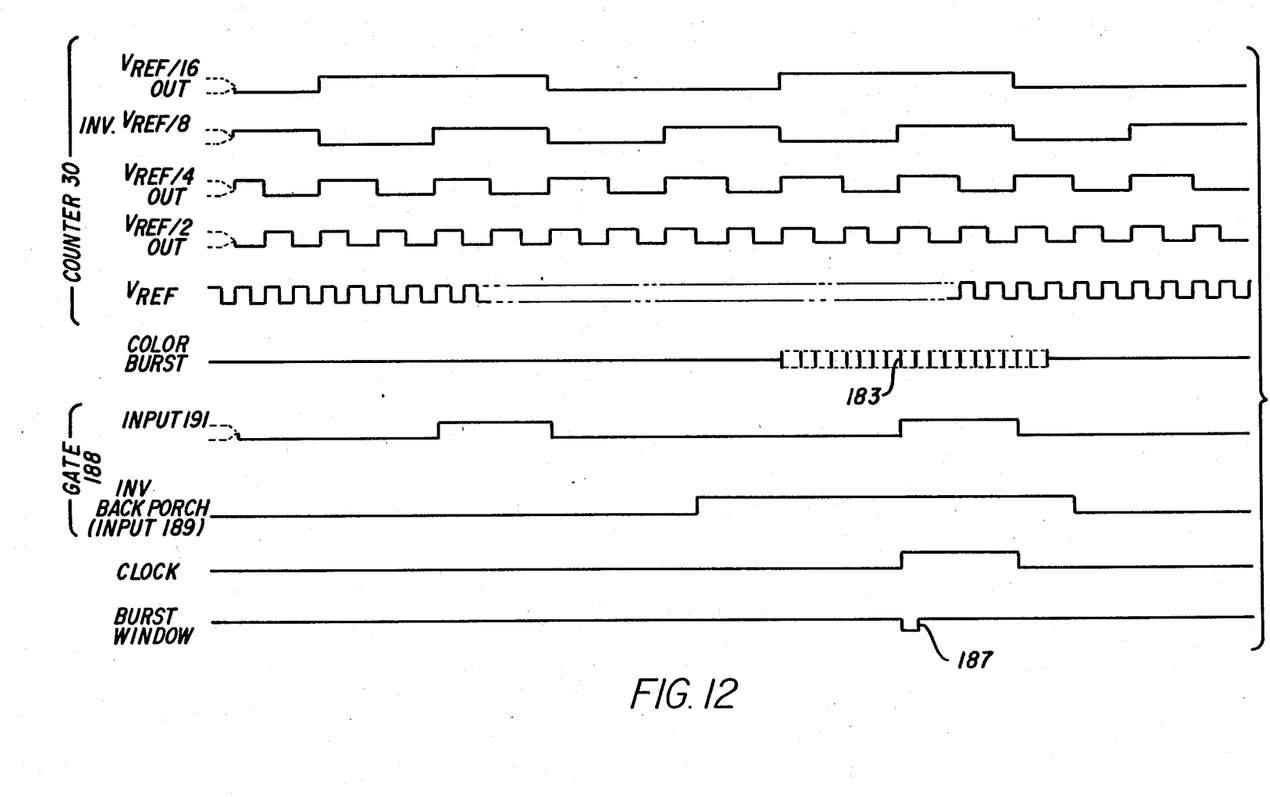
FIG. 12 is a a timing diagram to assist in explaining the generation of the burst window pulse.

In an exemplary embodiment, there is shown in FIG. 10 the burst cycle selector 24 which selects the fifth cycle of the gated color burst for generation of the burst window. Although it is preferable to utilize the last cycle of color burst to permit maximum settling time after the burst begins, in the present embodiment hardware constraints dictate using the fifth cycle of the color burst. The manner in which this is accomplished can be made clearer by first referring to the timing diagram of FIG. 12. There is shown a leading edge, identified by the number 183, of the fifth cycle of color burst. It is apparent from FIG. 12 that an inverted output of the video back porch signal is high during the nine cycles of color burst. It is further apparent that when signal $V_{REF}/16$ is ANDed with aninverted signal $V_{REF}/8$ during the presence of the back porch, a leading portion of the burst window (identified by the number 187) is defined. This is implemented by means of an AND gate 188 in FIG. 10 which includes an input 189 for receiving the inverted back porch signal from the sync stripper 28 (via an inverter 190), as well as an input 191 for receiving the ANDed output of inverted $V_{REF}/8$ and $V_{REF}/16$ from an upstream AND gate 192. In the present embodiment, $V_{REF}/8$ and $V_{REF}/16$ are generated from the 227 down counter 30 (FIG. 11). The output of AND gate 188 clocks a downstream SR latch 196 which has its active low set input connected to the oscillator output for receiving $V_{REF}$. In this manner, when the output of AND gate 188 goes high, the leading (falling) edge of the burst window pulse 187 (FIG. 12) is generated at the latch output; with the latch output going high upon receipt of the falling edge of the next $V_{REF}$ pulse in order to generate the trailing edge of the burst window pulse 187.

Having described the generation of the burst window pulse B, attention now will be turned to the generation of the horizontal sync window pulse 11. As described previously in a somewhat brief manner with reference to FIG. 2, the sync window pulse enables the 227 down counter 30. More specifically, as shown at the upper left corner of FIG. 11, the stripped sync pulse from stripper 28 is fed through an inverter 200 to the clock input of a flip-flop 202 which operates on receipt of the leading edge of the sync pulse to load the count 227 into the downstream counter 30. Counter 30 is clocked by means of an EXOR gate 206 which has an input 208 for receiving $V_{REF}$ from the phase lock loop 36, and an input 210 for receiving the NEG EDGE input.

Figure 13:
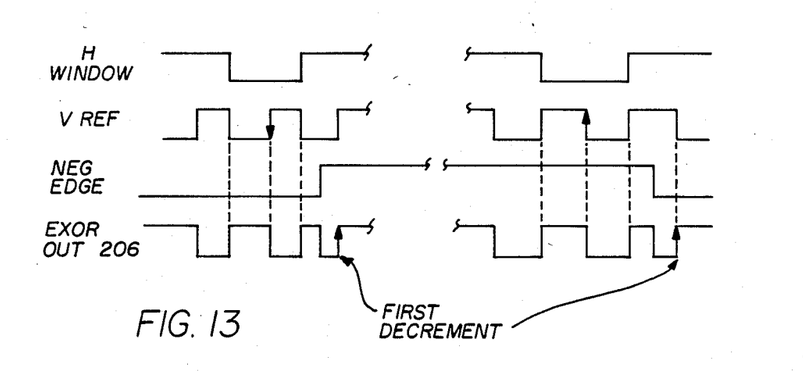
FIG. 13 is a timing diagram showing the generation of a corrected $V_{REF}$ signal.

With regard to the signal NEG EDGE, it has been indicated previously that the VCO output ($V_{REF}$) is inverted every other horizontal line relative to the horizontal sync pulse. The reasons and resulting problems associated with this inversion have been described previously herein with reference to the clocking of the PLL counter 52. Similarly, to avoid misclocking the counter 30 as a result of this inversion, the oscillator output $V_{REF}$ is inverted every other line by the gate 206, with the resulting output from gate 206 shown in the timing diagram of FIG. 13. More specifically, to obtain a rising edge pulse at the trailing edge of each horizontal window, $V_{REF}$ is inverted every other line upon terminantion of the horizontal window by EXORing NEG EDGE with $V_{REF}$. In this manner there are 227 rising edges between receipt of successive horizontal sync pulses so that counter 30 (FIG. 11) is properly counted down from 227 to zero. Once the zero count has been reached, a ripple carry out pulse from output 210 of the counter 30 is fed back through an inverted 211 to the active low set input of the flip flop 202 and a new count of 227 is loaded into the down counter 30.

Generation of the NEG EDGE input to EXOR gate 206 (FIG. 11) is accomplished by a D flip-flop 212 which has its rising edge-triggered clock input tied to the ripple carry output 210 of the down counter 30. Furthermore, the active low set and reset inputs of the flip-flop 212 are tied high, with the active low output 213 of the flip-flop being fed back to the D input. The output 214 (NEG EDGE) of the flip-flop 212 changes state at the end of every sync window pulse H as shown in FIG. 6.

Upon generation of the ripple carry out from the 227 down counter 30 (FIG. 11), this active low signal is inverted by a downstream inverter 216 to generate the sync window pulse H which is fed to the burst window/sync window selector 26. Selection of either the sync window pulse H or the burst window pulse B to be fed to the PLL counter enable is accomplished by the multiplexer 74 in FIG. 3. As discussed previously, the selection of horizontal sync or color burst information to the phase detector 48 input is accomplished at the multiplexer 74 in response to the burst present signal from the detector 70, which also selects the window H or burst window B. That is, in response to the detection of color burst in the external video signal, the multiplexer 74 outputs the color burst information and the burst window B. On the other hand if a lack of color burst is detected, then horizontal sync information and sync window H are outputted downstream by the multiplexer. In the absence of either color burst information or horizontal sync information, the up/down counter 52 (FIG. 2) is not enabled, which prevents the counter 52 from increamenting or decrementing its current count. Therefore the DC voltage generated across the varactor diode 134 is unchanged. When either color burst or horizontal sync information is present, the subsequent incrementing or decrementing of counter 52 generates a low amplitude AC signal which is superimposed on the aforementioned DC signal to generate a correction signal.

What is claimed is:

1. Apparatus for generating signals for clocking a video system, the apparatus comprising:
   a. means for receiving (i) a first external video signal having a first frequency portion, and (ii) a second external video signal having a second frequency portion but which has substantially none of the first frequency portion, the second frequency being lower than the first frequency;
   (b) means (i) for detecting the presence of the first frequency portion and for generating a first indicating signal in response to the first video signal, and (ii) for detecting the absence of the first frequency portion and for generating a second indicating signal in response to the second video signal; and
   (c) means (i) which are responsive to the first indicating signal for generating a first clock output which is synchronous with the first frequency portion of the first video signal for clocking the video system, and (ii) which are responsive to the second indicating signal for generating a second clock output which is synchromous with the second frequency portion of the second video signal for clocking the video system when the first video signal is absent from the receiving means, the second clock output having an output frequency which is substantially the same as the output frequency of the first clock output so as to clock the video system at the same rate;
   the clock generating means including:
      (i) oscillating means for generating the first and second clock outputs; and
      (ii) means for detecting a phase difference (i) between an output of the oscillating means and the first frequency portion of the first video signal for adjusting the first clock output so that it is synchronous with the first frequency portion, and (ii) between the output of the oscillating means and the second frequency portion of the second video signal for adjusting the second clock output so that it is synchronous with the second frequency portion.

2. The apparatus as set forth in claim 1 wherein:
   a. the first frequency portion of the first video signal is color burst, and the second frequency portion of the second video signal is horizontal sync; and
   b. the phase detecting means includes means for detecting an edge of the color burst and for detecting an edge of the horizontal sync, and for comparing these edges to calculate the phase difference.

3. The apparatus as set forth in claim 2 wherein the phase detecting means includes;
   a. means for generating a phase difference signal in response to the phase difference; and
   b. means for adjusting the first and second clock outputs of the oscillating means, in response to the phase difference signal, so that the first and second clock signals are synchronous with the first and second external video signals.

4. The apparatus as set forth in claim 1 wherein:
   a. the first frequency portion of the first video signal is color burst information, and the second frequency portion of the second video signal is horizontal sync information;
   b. the oscillating means further comprises means for generating a reference signal having a frequency which is related to the frequencies of the first and second clock outputs; and
   c. the phase detector means further includes means, receptive of the reference signal and the color burst and horizontal information, for making a phase comparison between the reference signal and the color burst and horizontal sync information so as to generate first and second error signals for adjusting the frequencies of the first and second clock outputs.

5. The apparatus as set forth in claim 4 wherein the phase detector means includes means (i) for comparing the phase of the reference signal with the phase of the color burst during the presence of the first video signal so as to generate the first error signal, and (ii) for comparing the phase of the reference signal with the phase of the horizontal sync, during the presence of the second video signal and the absence of the first video signal, so as to generate the second error signal.

6. The apparatus as set forth in claim 5 wherein the reference signal has a frequency $f_r$ which is related to the oscillator frequency $f_o$ by the equation $f_r$ multiplied by $n = f_o$, where n is an integer.

7. The apparatus as set forth in claim 1 wherein the oscillating means includes means for generating, during an absence of the first and second video signals at the receiving means, a third clock output at the output frequency of the first and second clock signals.

8. A method for clocking a video system, the method comprising the steps of:
   a. receiving a first external video signal having a first frequency portion and a second external video signal having a second frequency portion but substantially none of the first frequency portion, the second frequency being lower than the first frequency;

b. detecting the presence or absence of the first freqency portion, generating a first output in response to the first video signal when the presence of the first frequency portion is detected, and generating a second output in response to the second video signal when the absence of the first freqency portion is detected;

c. generating a first clock signal in response to the first output in a manner that the first clock signal is synchronous with the first freqency portion of the first video signal in order to clock the video system; and d. generating a second clock signal in response to the second output in a manner that the second clock signal is synchronous with the second frequency portion of the second video signal in order to clock the video system during an absence of the first video signal, the second clock signal having an output frequency which is substantially the same as the output freqency of the first clock signal so as to clock the video system at the same rate;

the first and second clock signal generating steps comprising generating an oscillating signal, and detecting a phase difference (i) between the oscillating signal and the first frequency portion of the first video signal for adjusting the first clock signal so that it is synchronous with the first frequency portion, and (ii) between the oscillating signal and the second frequency portion of the second video signal for adjusting the second clock signal so that it is synchronous with the second frequency portion.

9. Apparatus for locking an imaging device of a video system to a received external composite video signal, so that continuous synchronization is maintained when the composition of the received signal changes between a first signal having color burst and horizontal synch information portions and a second signal having a horizontal synch information portion but no color burst information portion, the apparatus comprising;

input means for receiving the external signal;

color burst detector means connected to the input means for detecting the presence or absence of the color burst information portion in the received signal;

voltage controlled oscillator means, responsive to application of a control voltage, for generating a signal at a frequency for clocking the imaging device;

means, connected to the input means and the oscillator means and responsive to the color burst detector means, for varying the application of the control voltage to the oscillator means to adjust the frequency of the clocking signal in synchronization with the color burst information portion of the received signal when the detector means detects that the color burst information portion is present in the received signal, and in synchronization with the horizontal synch information portion when the detector means detects that the color burst information portion is absent from the received signal.

10. Apparatus, as in claim 9, for locking the imaging device for continuous synchronization when the composition of the received signal changes among the first signal, the second signal, and a third having neither color burst nor horizontal synch information, wherein the oscillator voltage varying means further comprises means for maintaining the last applied voltage when neither color burst nor horizontal synch information is present in the received signal.

11. Apparatus as in claim 9, wherein the voltage varying means comprises a phase detector for comparing the phases of first and second phase detector input signals and generating a difference output signal based thereon; means connecting the phase detector and the oscillator and responsive to the clocking signal for providing a feedback reference signal as the first phase detector input signal; and selector means, connected to the input means and the phase detector and responsive to the color burst detector means, for providing the color burst information portion of the received signal when the detector means detects that the color burst information portion is present and the horizontal synch portion when the detector means detects that the color burst information portion is absent, as the second phase detector input signal.

12. Apparatus as in claim 11, further comprising means connected to the input means for generating a burst window signal within which an edge of the color burst information portion of the received signal will appear, if present; means connected to the input means for generating a horizontal synch window signal within which an edge of the horizontal synch information portion of the received signal will appear; counter means connected to receive the phase difference signal from the phase detector in the presence of an enabling signal and to deliver a voltage varying signal to the oscillator; and window selector means connected to the burst window signal generating means, to the horizontal synch window signal generating means, and to the counter and responsive to the color burst detector means, for delivering the burst window signal when the color burst information portion is present, and the horizontal synch window signal when the color burst information portion is absent, as the enabling signal to the counter.

13. Apparatus as in claim 12, wherein the input means comprises a burst gate for gating the color burst information portion of the received signal, and a synchronization stripper for stripping the horizontal synch information portion from the received signal.

14. Apparatus as in claim 13, wherein the burst window signal generating means comprises burst cycle selecting means connected between the burst gate and the window selector means for selecting a burst window signal for enabling the counter, when the color burst information portion is present, during the occcurrence of a particular cycle of the color burst information portion of the received signal.

15. Apparatus as in claim 14, wherein the burst cycle selecting means comprises means selecting a window for enabling the counter during the occurrence of a cycle of the color burst information portion beyond the third cycle.

16. Apparatus as in claim 14 wherein the oscillator comprises a voltage controlled oscillator having a varactor diode, and wherein the burst window signal generating means, the horizontal synch window signal generating means, the phase detector and the counter function to compare the phase of corresponding leading edges of the feedback reference signal and the selected cycle of color burst information portion or horizontal synch information portion to adjust the frequency of the oscillator by changing voltage applied across the varactor diode.

17. A method for locking an imaging device of a video system to a received external composite video signal, so that continuous synchronization is maintained when the composition of the received signal changes between a first signal having color burst and horizontal synch information portions and a second signal having a horizontal synch information portion but no color burst information portion, the method comprising:

receiving the external signal;

detecting the presence or absence of the color burst information portion in the received signal;

applying control voltage to a voltage controlled oscillator to generate a signal at a frequency for clocking the imaging device;

varying the applied control voltage to adjust the frequency of the clocking signal in synchronization with the color burst information portion of the received signal when the detecting step indicates that the color burst information portion is present in the received signal and varying the applied voltage in synchronization with the horizontal synch information portion when the detecting step indicates that the color burst information portion is absent in the received signal.

* * * * *